US009495412B1

United States Patent
Williams et al.

(10) Patent No.: US 9,495,412 B1
(45) Date of Patent: Nov. 15, 2016

(54) TECHNICAL ELECTRONIC DISCOVERY ACTION MODEL

(71) Applicant: Cox Communications, Inc., Atlanta, GA (US)

(72) Inventors: Steve Thomas Williams, Alpharetta, GA (US); Keith Entwistle, Cumming, GA (US); Kristen Weathersby, Atlanta, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 0 days.

(21) Appl. No.: 14/171,216

(22) Filed: Feb. 3, 2014

Related U.S. Application Data

(63) Continuation of application No. 12/856,023, filed on Aug. 13, 2010, now Pat. No. 8,645,401.

(60) Provisional application No. 61/233,653, filed on Aug. 13, 2009.

(51) Int. Cl.
    *G06F 17/30*    (2006.01)
    *G06Q 50/18*    (2012.01)
    *G06Q 10/10*    (2012.01)

(52) U.S. Cl.
    CPC ......... *G06F 17/30386* (2013.01); *G06Q 50/18* (2013.01); *G06F 17/30867* (2013.01); *G06Q 10/10* (2013.01)

(58) Field of Classification Search
    None
    See application file for complete search history.

(56) References Cited

U.S. PATENT DOCUMENTS

| 8,645,401 | B2 | 2/2014 | Williams et al. |
| 2004/0098339 | A1 | 5/2004 | Malek et al. |
| 2006/0168255 | A1 | 7/2006 | Katz et al. |
| 2007/0085711 | A1 | 4/2007 | Bousquet et al. |
| 2008/0033904 | A1* | 2/2008 | Ghielmetti et al. ............... 707/1 |
| 2008/0319984 | A1* | 12/2008 | Proscia et al. ..................... 707/5 |
| 2009/0150906 | A1 | 6/2009 | Schmidt et al. |
| 2009/0198698 | A1 | 8/2009 | Bahrs et al. |
| 2010/0030798 | A1* | 2/2010 | Kumar et al. ................. 707/102 |
| 2010/0082382 | A1* | 4/2010 | Kisin et al. ........................ 705/7 |
| 2010/0241620 | A1* | 9/2010 | Manister ........... G06F 17/30616 707/709 |
| 2010/0318569 | A1 | 12/2010 | Munday |
| 2011/0040748 | A1 | 2/2011 | Williams et al. |

OTHER PUBLICATIONS

Office Action mailed Dec. 12, 2012, in co-pending U.S. Appl. No. 13/288,877.
Office Action mailed Jul. 2, 2013, in co-pending U.S. Appl. No. 13/288,877.
Office Action mailed Dec. 9, 2013, in co-pending U.S. Appl. No. 13/288,877.
U.S. Appl. No. 13/288,877, filed Nov. 3, 2011 entitled: Custodian Search.
Office Action mailed Jul. 8, 2014, in co-pending U.S. Appl. No. 13/288,877.
Office Action mailed Dec. 12, 2014, in co-pending U.S. Appl. No. 13/288,877.
Office Action mailed Mar. 24, 2016, in co-pending U.S. Appl. No. 13/288,877.

* cited by examiner

*Primary Examiner* — Rehana Perveen
*Assistant Examiner* — Raheem Hoffler
(74) *Attorney, Agent, or Firm* — Merchant & Gould

(57) ABSTRACT

Embodiments of the present invention provide for an end-to-end system and method for identifying custodians, preserving, collecting, processing, reviewing, analyzing, producing, presenting, and dispositioning data responsive to a legal discovery request.

20 Claims, 10 Drawing Sheets

TECHNICAL ELECTRONIC DISCOVERY ACTION MODEL

CROSS REFERENCE TO RELATED APPLICATIONS

The present application is a continuation of U.S. application Ser. No. 12/856,023 filed Aug. 13, 2010 entitled "Technical Electronic Discovery Action Model," now U.S. Pat. No. 8,645,401, which claims priority to Provisional Application No. 61/233,653 filed Aug. 13, 2009 entitled "Technical E-Discovery Action Model," which both are hereby incorporated by reference.

BACKGROUND

In today's electronic age, massive volumes of electronic data are produced and maintained by most institutions. If an institution is in litigation, it may have to produce all electronic and other data related to the case. Electronic discovery (e-discovery) refers to the process of collection, preparation, review and production of electronic documents in litigation discovery. Electronically-stored information (ESI) which may be relevant evidence in litigation includes, but is not limited to: electronic files; communications, including electronic mail (e-mail) and instant messages sent or received, and voicemail; data produced by calendaring software; and information management software. ESI may also include data that may not be visible that is generated by computer systems and stored on hard-drives, e-mail and instant messaging, information management software, handheld computing devices (e.g., smartphones), telecommunications devices, and back-up storage devices. ESI may be stored on a variety of electronic devices and removable devices (e.g., internal and external drives, PDAs, smart phones, servers, laptops, backup tapes, thumb drives, CDs, DVDs, etc.) and may reside at different locations (e.g., on home or work systems, third-party or personal systems, in departmental files, etc.). As should be appreciated, e-discovery can be a very time-consuming and expensive process for an institution. The process of identifying custodians and preserving and collecting data can be a very complicated process. The term "custodian" describes a person or a physical asset (e.g., a storage locker, piece of equipment, cell phone, etc.) within an institution that may have data relevant to a particular matter. There is a need in the art for improved methods and systems for identifying custodians, preserving, collecting, processing, reviewing, analyzing, producing, presenting, and dispositioning data responsive to a legal discovery request.

SUMMARY

Embodiments of the present invention provide for end-to-end systems and methods for identifying custodians, preserving, collecting, processing, reviewing, analyzing, producing, presenting, and dispositioning data responsive to a legal discovery request.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION THE DRAWINGS

DETAILED DESCRIPTION

Figure 1:
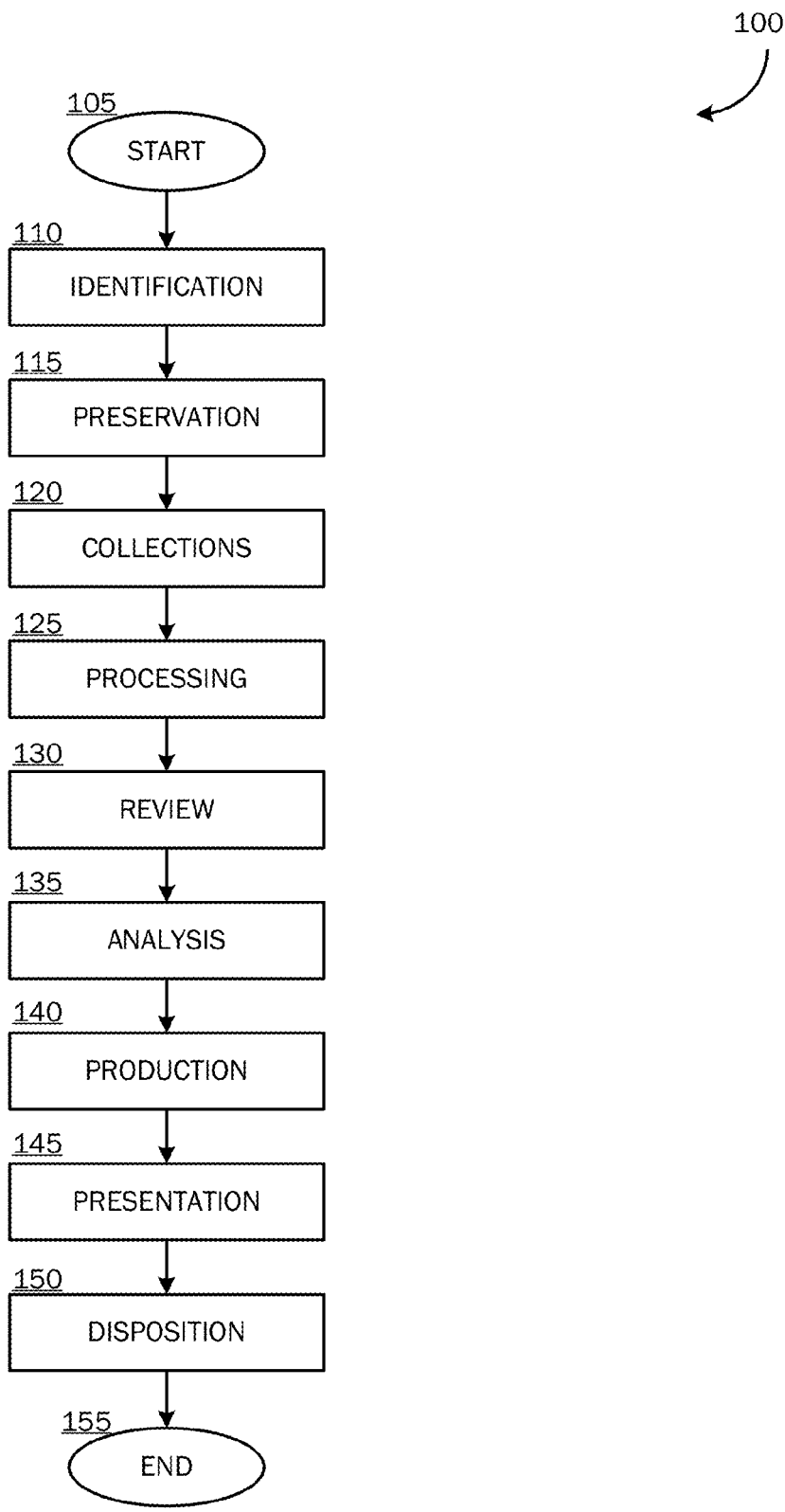
FIG. 1 illustrates a flowchart of a methodology to identify, preserve, collect, process, review, analyze, produce, present, and disposition data responsive to a legal discovery request according to embodiments of the present invention.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

The duty to preserve relevant ESI may commence upon initiation of a lawsuit by or against an institution, or if litigation may be anticipated. ESI may include all electronically stored information and data subject to possession, control, or custody of an institution regardless of its format and the media on which it may be stored. As should be appreciated, due to the amount of ESI an institution may have, in addition to the prudence and documentation required for a forensically-sound e-discovery, e-discovery can be very time-consuming and expensive for an institution. According to embodiments of the present invention, a comprehensive e-discovery life cycle includes an identification phase, a preservation phase, a collection phase, a review phase, an analysis phase, a production phase, a presentation phase, and a disposition phase. Embodiments of the present invention provide for an improved method for identifying custodians, preserving, collecting, processing, reviewing, analyzing, producing, presenting, and dispositioning data responsive to a legal discovery request.

FIG. 1 illustrates a flowchart of a methodology 100 to identify, preserve, collect, process, review, analyze, produce, present, and disposition data responsive to a legal discovery request according to embodiments of the present invention. The methodology 100 follows an electronic discovery (e-discovery) model.

According to an embodiment, a triggering event may occur, which may cause a need for an institution to locate all data, including electronically-stored information (ESI), that may of be of relevance to the triggering event. The e-discovery method 100 starts at OPERATION 105, and then proceeds to an Identification Phase in OPERATION 110, which is when a scope and breadth of a discovery request may be determined.

The next operation in the process 100 is a Preservation Phase OPERATION 115. During this stage, custodian information may be preserved, and statuses of custodians may be determined and documented. This operation 115 may entail interviews, litigation holds, scope analyses, a Rule 26(f) conference, and a formulation of a project plan or statement of work (SOW).

The process 100 proceeds to OPERATION 120, which is a Collections Phase. During the Collections Phase, physical and electronic assets may be gathered, electronically imaged if necessary, and saved to an allocated space on a network.

The process 100 then proceeds to a Processing Phase at OPERATION 125. During this phase, data may be converted into a standard format, wherein metadata may be extracted, indexed, and searched. Data may then be prepared for shipping and then shipped for review.

The process 100 then proceeds to a Review Phase at OPERATION 130. During the Review Phase, accounts may be set up for review of data and privileged data may be marked-up and redacted.

The process 100 then proceeds to an Analysis Phase at OPERATION 135. During the Analysis Phase, ESI may be categorized, and various analyses may be performed and reported. When it is determined that the data is ready for production, the process 100 proceeds to a Production Phase at OPERATION 140.

During the Production Phase 140, a meet and confer may occur and data may be analyzed and determined if it meets production requirements. Files may be copied to a media and delivered to a recipient.

The process 100 proceeds to a Presentation Phase at OPERATION 145. During the Presentation Phase, data may be prepared and presented in a trial or in a settlement negotiation. After the case is closed, litigation holds may be removed, data may be archived, and a disposition report may be created.

The process 100 then proceeds to a Disposition Phase at OPERATION 150. During the Disposition Phase, once a retention window has expired, data may be disposed of, and some assets may be repurposed. The process 100 ends at OPERATION 155. Each operation is disclosed in greater detail below.

Figure 2:
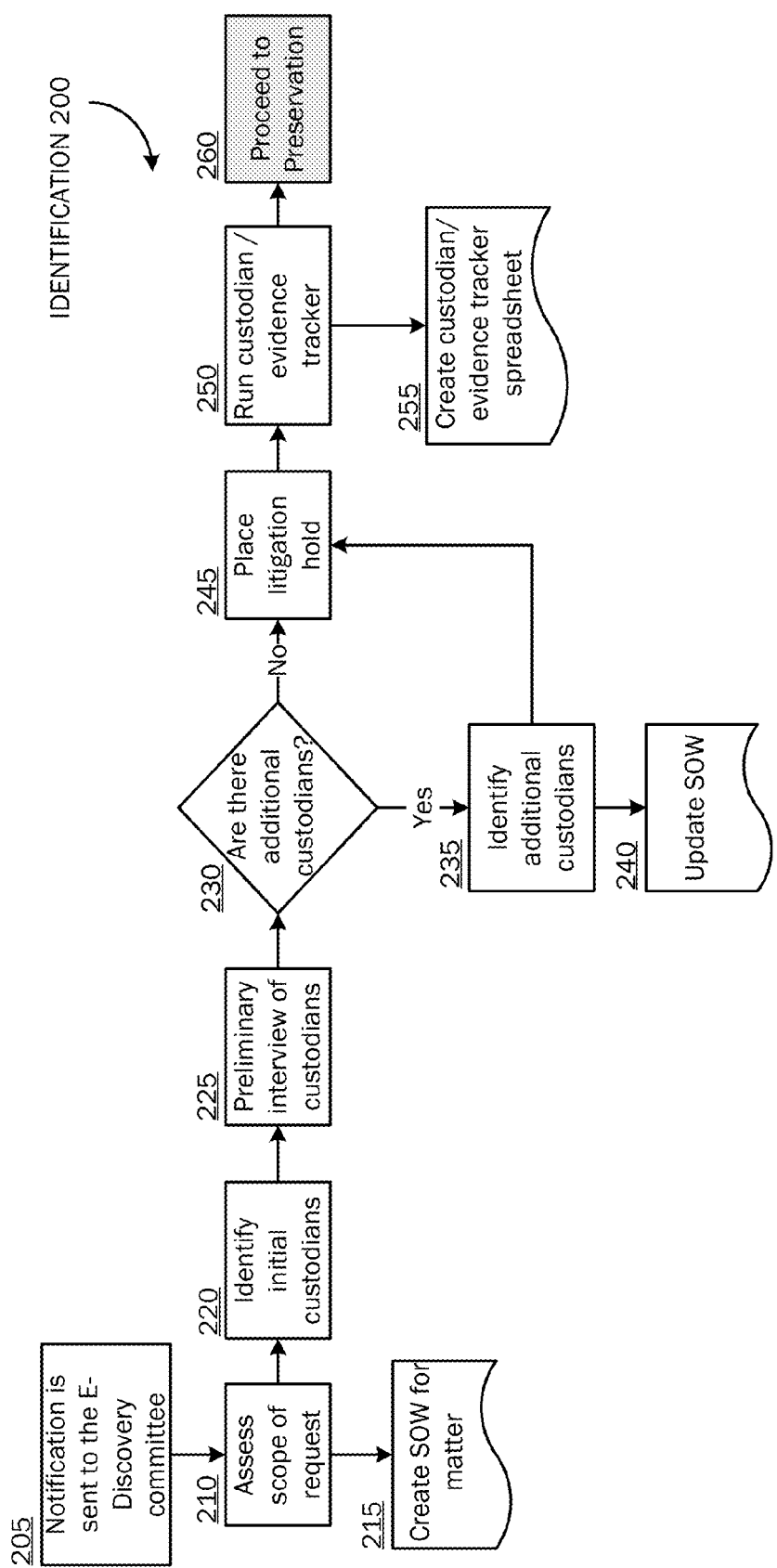
FIG. 2 illustrates a flow chart for the Identification Phase 110 according to embodiments of the present invention.

FIG. 2 illustrates a flowchart for the Identification Phase according to embodiments of the present invention. FIG. 2 may disclose OPERATION 110 of FIG. 1 in greater detail. Referring now to FIG. 2, at OPERATION 205 a notification of a legal discovery request may be sent to an e-discovery committee. According to embodiments of the present invention, an e-discovery committee may be comprised of one or more persons which may include members from legal staff, compliance, records management, IT, key business areas, and risk management, who may work to execute a response to a legal discovery request. A notification may be in the form of an e-mail, a summons, or via other various discovery devices.

At OPERATION 210 a scope of the legal discovery request may be assessed. The legal discovery request may be assessed for granularity, that is, how it may be broken down into smaller and more manageable parts. Areas of risk may be identified, costs may be predicted, timelines may be established, and an exposure and scope of discovery may be estimated. A scope of a discovery may include an estimate of resources required for identifying, preserving, collecting, processing, reviewing, analyzing, producing, presenting, and dispositioning data responsive to a legal discovery request.

At OPERATION 215 a statement of work (SOW) for the discovery may be created. Overall details of the discovery may be defined. Other information that may be addressed by an SOW may include a scope of work, timelines and dates, applicable standards, special requirements, key words and relevant terms, as well as other information relevant to a project plan responsive to a legal discovery request.

At OPERATION 220, custodians may be identified. According to embodiments, custodians may be a person or a physical asset (e.g., a storage locker, piece of equipment, cell phone, etc.) within an institution that may have data relevant to a particular matter. According to embodiments, a broad group of pertinent custodians may be identified. That is, at an early stage in a discovery process, depending upon a scope of the discovery, individuals may not be identified at this time; however, larger entities (for example departments or groups of people) that may be likely to possess or have access to responsive documents and data may be identified.

At OPERATION 225, a preliminary interview of custodians may be performed. Custodians identified in OPERATION 220 may be contacted and questioned as to if he/she may have any knowledge of any matter relevant to the subject matter involved in the legal discovery request (e.g., does he/she know what the particular case is about; if not, does he/she know somebody in his/her department that would know, etc.). During the preliminary interview of custodians at OPERATION 225, it may be discovered that there may be additional custodians likely to possess or have access to responsive documents.

The process proceeds to DECISION OPERATION 230, where a determination is made as to whether additional custodians may be present. If it is determined that additional custodians may be present, at OPERATION 235, those additional custodians may be identified.

If additional custodians are identified in OPERATION 235, in OPERATION 240, the SOW may be updated with the identified additional custodians.

If it is determined that there are no additional custodians at DECISION OPERATION 230, or once additional custodians are identified at OPERATION 235, at OPERATION 245, a directory capable of tracking a variety of objects such as users, systems, resources, and services (e.g., A by MICROSOFT CORPORATION) may be utilized to place litigation holds 245. For example, particular attributes may be flagged, denoting that they are subject to a litigation hold. According to an embodiment, this process may be tied into a help desk or system administration process, whereby if a help desk employee or system administrator receives an account disablement termination or other type of request for service to an account that is subject to litigation holds, a request may be sent to the discovery committee for approval. By notifying and obtaining approval from a discovery committee for such requests, it may prevent accounts in which responsive documents might exist from being deleted, disabled, or modified.

At OPERATION 250, a location, scope, and format of data repositories to which identified custodians may have/ had access may be determined. Determined information may include equipment issued to and used by a custodian, mailboxes, home directories, shared directories and database, local hard drives, as well as other storage devices. According to embodiments, a software application module capable of determining such custodian information may be utilized (e.g., custodian/evidence tracker application).

At OPERATION 255, a custodian/evidence tracker spreadsheet may be created. According to embodiments, a software application module (e.g., custodian/evidence tracker application) may populate a database with information obtained in OPERATION 250. At OPERATION 260, the process proceeds to the Preservation Phase.

Figure 3:
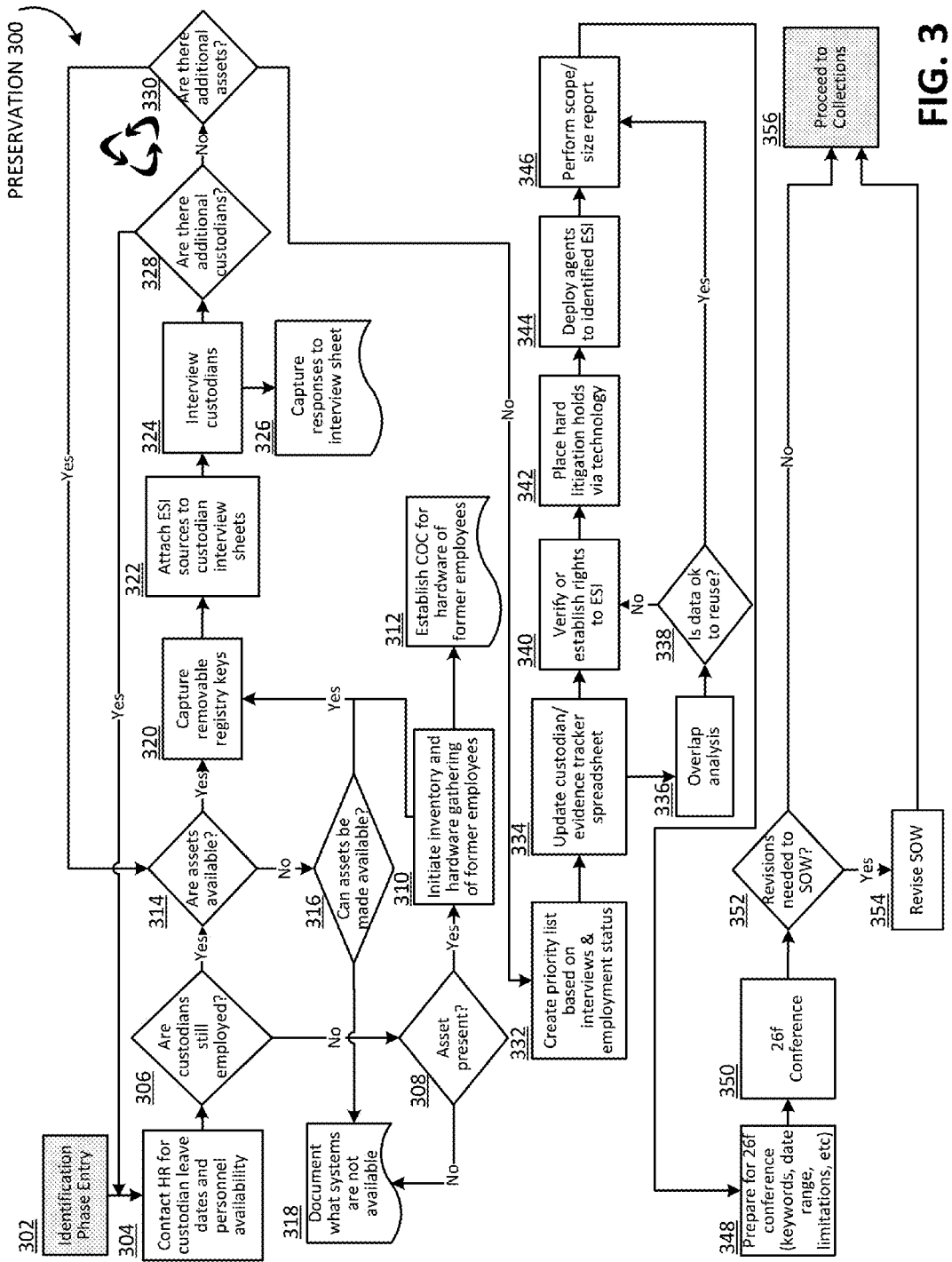
FIG. 3 illustrates a flow chart for the Preservation Phase 115 according to embodiments of the present invention.

FIG. 3 illustrates a flowchart for the Preservation Phase according to embodiments of the present invention. FIG. 3 may disclose OPERATION 115 of FIG. 1 in greater detail. Referring now to FIG. 3, at OPERATION 302 the Preservation Phase is entered from the Identification Phase.

According to embodiments, results obtained from tracking custodians and evidence in OPERATION 250 may reveal such information as whether an employee is active, inactive, terminated, on leave of absence, and such. At OPERATION 304, utilizing this information, a Human Resources (HR) Department may be queried about possible upcoming custodian availability information (e.g., upcoming scheduled vacations of employees, possible upcoming actions that may eliminate positions, etc.) that may provide visibility going forward into the discovery case life cycle.

The process proceeds to DECISION OPERATION 306, where a determination is made as to whether a custodian is still employed. If it is determined that the custodian is no longer employed, at DECISION OPERATION 308, a determination is made as to whether his/her assets may be present.

If it is determined at DECISION OPERATION 308 that an asset of a custodian who is no longer employed with the institution is not present, at OPERATION 318, an investigation as to what may have happened to the asset (where it may be, why it is no longer existing, etc.) may be conducted and documented.

If at DECISION OPERATION 308 it is determined that an asset of a custodian who is no longer employed with the institution is present, at OPERATION 310, an inventory and hardware gathering may be initiated; and at OPERATION 312, a chain of custody (COC) for hardware of former employees may be established.

If at DECISION OPERATION 306 it is determined that a custodian is still employed by the institution, at DECISION OPERATION 314, a determination is made as to whether an asset of the custodian is available. If at DECISION OPERATION 314 it is determined that an asset is not available, at DECISION OPERATION 316 a determination is made as to whether assets may be made available.

At DECISION OPERATION 316, determining whether an asset may be available may comprise determining whether a custodian is traveling and/or if he/she may be able to connect to a network for making his/her assets available. Consider, for example, an employee of an institution who has been determined a custodian of possible responsive data located on an asset in the employee's possession who is away from his/her office and traveling for business purposes. Consider also that he/she may not be attached to the institution's network at that time, and may not be attached for several weeks. Given this situation, a schedule may be ascertained for when the given asset may be available so that it may be captured for the discovery process. Consider as another example, an employee who may be traveling, but may be traveling to another office within the institution and thus may be connected to the institution's network. In order for an e-discovery team to have access to his/her asset, he/she may be contacted, and an arrangement may be made for the employee to connect his/her asset to the network overnight so that it may be imaged.

If it is determined at DECISION OPERATION 316 that an asset may not be made available, at OPERATION 318, an investigation as to what may have happened to the asset (where it may be, why it is not available, etc.) may be conducted and documented. For example, an employee may be on a business trip and may not be attached to the network, and may not be attached for several weeks.

If it is determined at DECISION OPERATION 314 that an asset is available or if at DECISION OPERATION 316 that an asset may be made available, at OPERATION 320, mobile (removable) registry keys may be captured. According to embodiments, this may be used to build a picture of what media (e.g. CD ROMs, thumb drives, or other devices) that may have been attached to a custodian's system at one point in time that relevant data for the discovery case may exist on may be identified. This information may then be included in an interview process.

At OPERATION 322, determined ESI sources may be attached to custodian interview sheets that may be utilized during a custodian interview process.

At OPERATION 324, a custodian may be contacted and interviewed regarding determined ESI sources. An interview may comprise a standard interview set of questions as well as additional questions that may be customized for a specified discovery case. A custodian interview may include such questions as "Do you have any other assets (computers) that are not listed on the interview sheet?" and "Do you work from a home computer?".

At OPERATION 326, responses to interview questions in OPERATION 324 may be captured and recorded.

At DECISION OPERATION 328, a determination may be made as to whether there may be additional custodians. For example, in a custodian interview in OPERATION 324, a new custodian may be identified. If one or more additional custodians are identified at DECISION OPERATION 328, the identified custodian(s) may be added to the custodian list and the process may repeat OPERATIONS 304-328 for the newly identified custodian(s).

If at DECISION OPERATION 328 a determination is made that there are no additional custodians, at DECISION OPERATION 330, a determination is made as to whether there may be additional assets. If additional assets are identified, the process may repeat OPERATIONS 314-330 for the newly identified assets.

If at DECISION OPERATION 330 a determination is made that there are no additional assets, at OPERATION 332, a priority list may be created based on information obtained from interviews, employment status data, counsel or opposing counsel priority requests, as well as other pertinent information.

At OPERATION 334, the custodian/evidence tracker spreadsheet created in OPERATION 225 of the Identification Phase may be updated.

At OPERATION 336, an Overlap Analysis may be performed. According to embodiments, an overlap analysis may be utilized for identifying overlapping assets and/or data. An overlap analysis may also be utilized for determining whether an identified custodian may be a custodian in a previous discovery matter or in a concurrent discovery matter. If a custodian is or has been a custodian in another matter, his/her assets may have already been collected, and data may be reused for the specified discovery case. According to embodiments, an overlap analysis may identify an asset of an existing case, when it was preserved, as well as with what criteria, key words, and date ranges it was preserved.

At DECISION OPERATION 338, a determination may be made as to whether identified overlapping data discovered in the overlap analysis in OPERATION 336 may be available for reuse. If it is determined that overlapping data may not be available to be reused or after a custodian/evidence tracker spreadsheet is updated in OPERATION 334, at OPERATION 340, privileges and rights to access electronically stored information (ESI) may be verified.

At OPERATION 342, hard litigation holds may be placed on systems to ensure the preservation of relevant data. That is, litigation holds may preserve deleted data and may record changes made to data. By placing litigation holds, employees may not be able to purge records or spoil data (intentionally or accidentally).

At OPERATION 344, agents may be deployed to identify ESI. At OPERATION 346, a scope/size report may be performed. The overlap analysis performed in OPERATION 336 may provide information for determining an overall size and scope of the discovery case.

At OPERATION 348, preparation for a 26(f) conference may be performed. Documents may be prepared for counsel to discuss, as well as keywords, date ranges, limitations, etc.

At OPERATION 350, a meet and confer (Rule 26(f) conference) may occur. During this conference, parties may confer to consider the nature and bases of their claims and defenses, and to discuss any issues relating to preserving discoverable information.

At DECISION OPERATION 352, a determination is made as to whether any revisions may be needed to the SOW. If it is determined that revisions are needed, at OPERATION 354, revisions may be made to the SOW.

If at DECISION OPERATION 352 it is determined that revisions are not needed, or after the SOW is revised in OPERATION 354, at OPERATION 356 the method proceeds to the Collections Phase.

Figure 4:
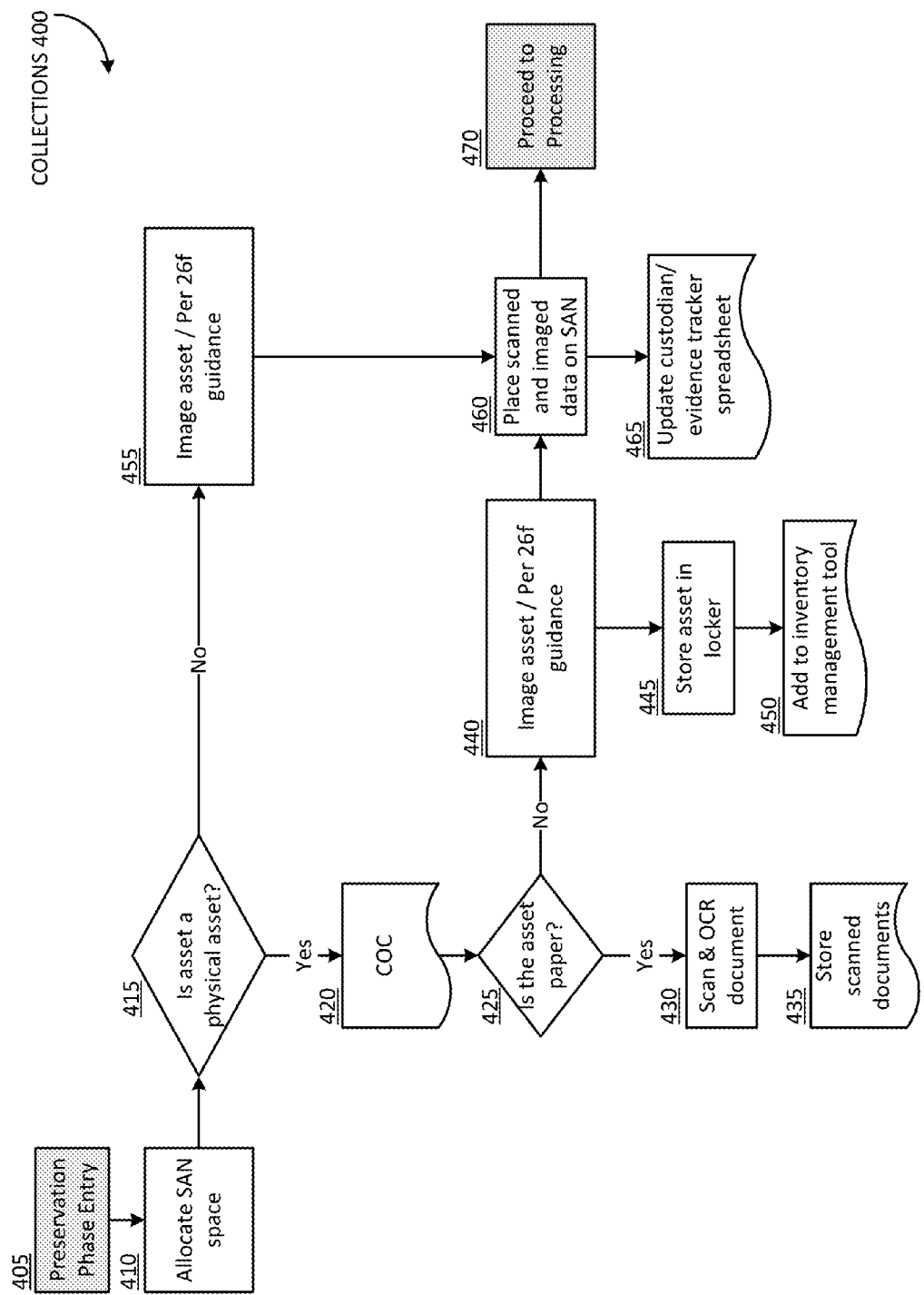
FIG. 4 illustrates a flow chart for the Collections Phase 120 according to embodiments of the present invention.

FIG. 4 illustrates a flowchart for the Collections Phase according to embodiments of the present invention. FIG. 4 may disclose OPERATION 120 of FIG. 1 in greater detail. Referring now to FIG. 4, at OPERATION 405 the Collections Phase is entered from the Preservation Phase.

At OPERATION 410, a storage area network (SAN) space may be allocated for collected data. According to embodiments, SAN space may be hard disk space located either locally or accessed remotely via a network connection.

At DECISION OPERATION 415, a determination is made as to whether an asset is a physical asset or an electronic asset. As should be appreciated, in a discovery matter there may be physical, tangible items such as laptops, PCs, hard drives, CDs, backup tapes, digital cameras, thumb drives, etc., as well as intangible items such as documents, e-mails, and metadata (which captures details such as when files and messages were created, last updated and deleted). If it is determined that the asset is a physical asset, at OPERATION 420, a COC (Chain of Custody) may be established for the physical asset. Documenting the chain of custody of potential, relevant evidence may be utilized to disprove tampering or alteration of evidence.

At DECISION OPERATION 425, a determination is made as to whether an asset is a paper asset. If it is determined that the asset is paper, at OPERATION 430, it may be scanned and converted from printed text into machine-editable text (OCR technology).

At OPERATION 435, scanned documents may be stored.

If a determination is made at DECISION OPERATION 425 that an asset is not paper, at OPERATION 440, the physical asset may be imaged per guidelines established during the 26(f) conference.

Once an image is made of an asset in OPERATION 440, at OPERATION 445 the asset may be stored. At OPERATION 450, documentation of the any actions done to the asset may be added to an inventory management tool.

If at DECISION OPERATION 415 a determination is made that the asset is not a physical asset, at OPERATION 455 the electronic asset may be imaged per guidelines established during the 26(f) conference. According to embodiments, imaging an asset may comprise making a forensically sound copy. That is, a bit-for-bit copy that generates a digital fingerprint, wherein metadata and deleted files may be captured.

After assets are imaged in OPERATIONS 440 and 455, at OPERATION 460, scanned and imaged data may be placed on the SAN. At OPERATION 465, the custodian/evidence tracker spreadsheet may be updated.

At OPERATION 470, the method proceeds to the Processing Phase.

Figure 5:
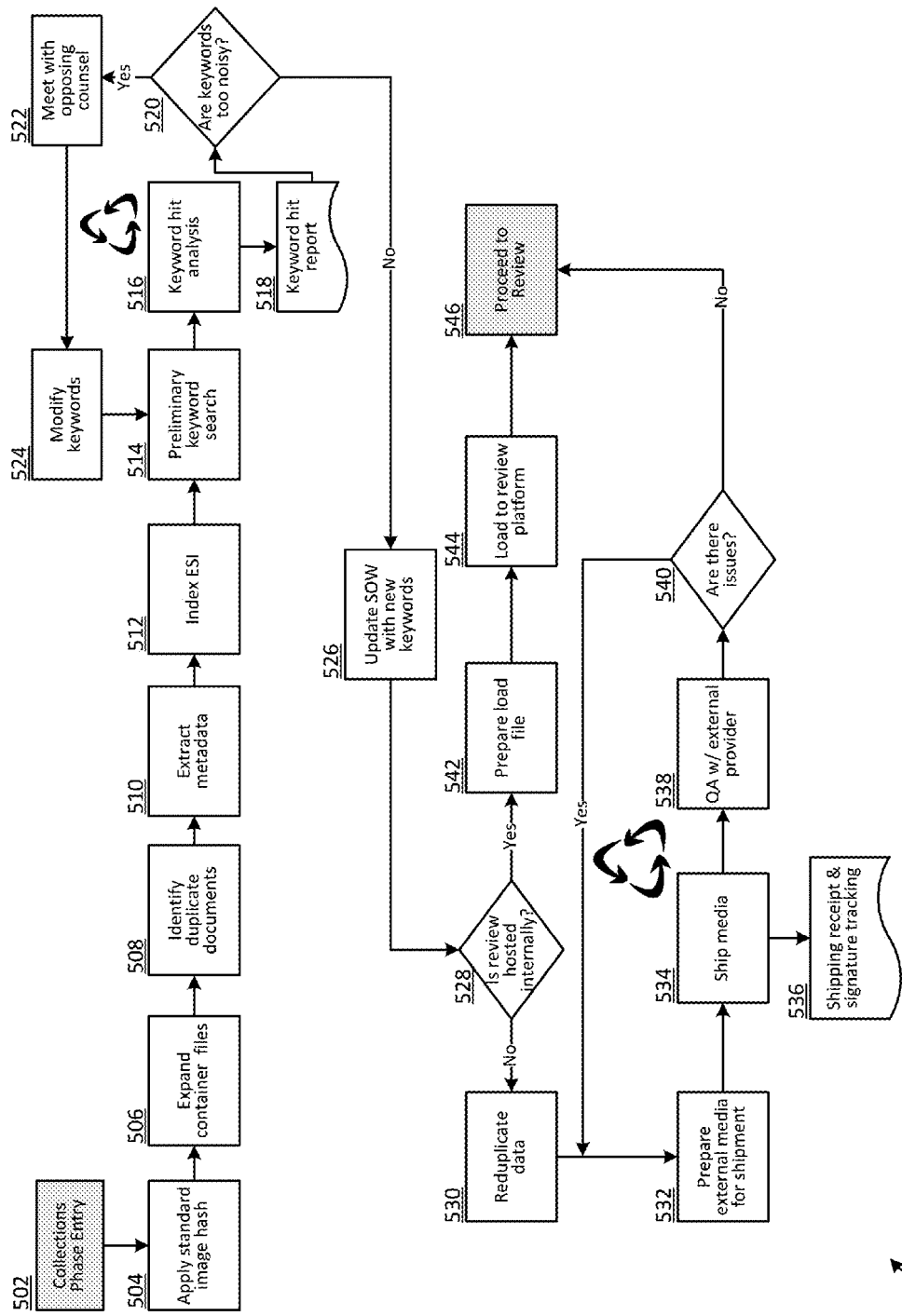
FIG. 5 illustrates a flow chart for the Processing Phase 125 according to embodiments of the present invention.

FIG. 5 illustrates a flowchart for the Processing Phase according to embodiments of the present invention. FIG. 5 may disclose OPERATION 125 of FIG. 1 in greater detail. Referring now to FIG. 5, at OPERATION 502 the Processing Phase is entered from the Collections Phase.

Oftentimes in an institution, if an employee will be receiving a new or existing computer, it may be configured with a standard system application layer which may provide various applications that the employee may utilize on the computer for business purposes. These various standard application files may be referred to as "noise files," and are generally not responsive to a discovery matter (e.g., Windows and Office files by MICROSOFT CORPORATION of Redmond, Wash.). At OPERATION 504, a standard image hash may be applied, which may hash "noise files." According to embodiments, noise files may be removed in the beginning of the Collections Phase, wherein data sets may be run and re-run with various keywords searches. That is, data may be reused for various searches as changes in a discovery matter may occur.

After "noise files" have been removed in OPERATION 504, at OPERATION 506, container files may be expanded. A container file is a file that may contain one more other files (e.g., a ZIP or RAR file). According to embodiments, when a container file is expanded, the one or more files contained within the container file may be extracted from the container file.

At OPERATION 508, duplicate data may be identified and hashed.

At OPERATION 510, metadata may be extracted. According to embodiments, metadata may provide details such as when files and messages were created, last updated or deleted.

At OPERATION 512, data may be indexed. According to embodiments, indexing may respectively build an index of keywords or any word or phrase found within ESI.

At OPERATION 514, a preliminary keyword search may be performed. According to embodiments, a keyword list identified and agreed to in the 26(f) conference may be utilized to search the index.

At OPERATION 516, a keyword hit analysis may be performed. At OPERATION 518, a report of the analysis may be produced and sent to counsel.

At DECISION OPERATION 520, a determination is made as to whether the keywords may be too noisy. That is, did the keywords utilized generate too many non-responsive results?

If it is determined that the keywords are too noisy, at OPERATION 522, a meeting with opposing counsel may be conducted, wherein a keywords list may be modified and agreed upon.

At OPERATION 524, keywords may be modified, and OPERATIONS 514-520 may be repeated until a final keyword list is agreed upon.

If at DECISION OPERATION 520 it is determined that the keywords are not too noisy, at OPERATION 526 the SOW may be updated with new keywords that are agreed on.

At DECISION OPERATION 528, a determination is made as to whether a review will be hosted internally or externally.

If it is determined that the review will be hosted externally, at OPERATION 530 data may be duplicated and published to a particular media (e.g., CD, DVD, hard drive, etc.) depending upon the amount of data.

At OPERATION 532, data may be prepared for shipment, and may be shipped at OPERATION 534. At OPERATION 536, a shipping receipt may be obtained and proof of delivery information may be requested through a signature tracking feature.

At OPERATION 538, when an external reviewer receives the media, a quality assurance session with the external provider (reviewer) may be performed to ensure there are no issues found.

At DECISION OPERATION 540, a determination may be made at to whether any issues are found.

If issues are found, those items may be corrected and the process may repeat OPERATIONS 532-540 until issues are resolved.

If at DECISION OPERATION 528 a determination is made that a review will be hosted internally, at OPERATION 542, a load file may be prepared for data. According to embodiments, load file preparation may allow for production of standard output files for use with standard review tools.

At OPERATION 544, data may be loaded into an electronic discovery review platform.

At OPERATION 546, the method proceeds to the Review Phase.

Figure 6:
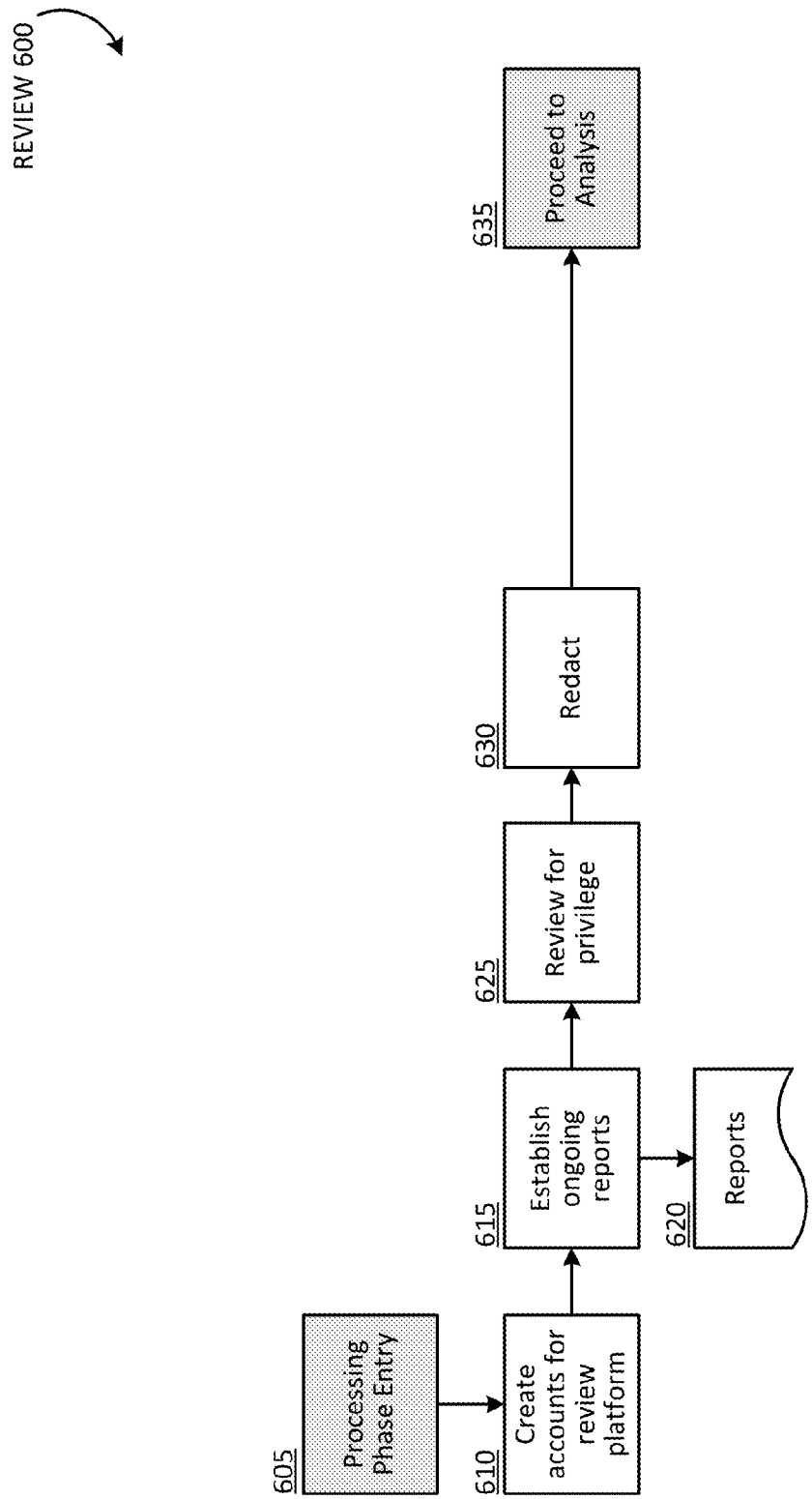
FIG. 6 illustrates a flow chart for the Review Phase 130 according to embodiments of the present invention.

FIG. 6 illustrates a flowchart for the Review Phase according to embodiments of the present invention. FIG. 6 may disclose OPERATION 130 of FIG. 1 in greater detail. Referring now to FIG. 6, at OPERATION 605 the Review Phase is entered from the Processing Phase.

At OPERATION 610, accounts may be created to enable secure access of data sets and review of data by internal and external counsel.

At OPERATION 615, ongoing reports may be established; and at OPERATION 620 reports may be generated, which may reveal such information as the number of documents are and how many have been processed.

At OPERATION 625, a review for privileged data may be conducted. According to embodiments, a review for privilege may be conducted in a two-tier model, where a paralegal may review for any privileged data, after which a privileged reviewer may conduct a review.

At OPERATION 630, any redactions, as well as any privileged mark-ups that need to occur may be done.

At OPERATION 635, the method proceeds to the Analysis Phase.

Figure 7:
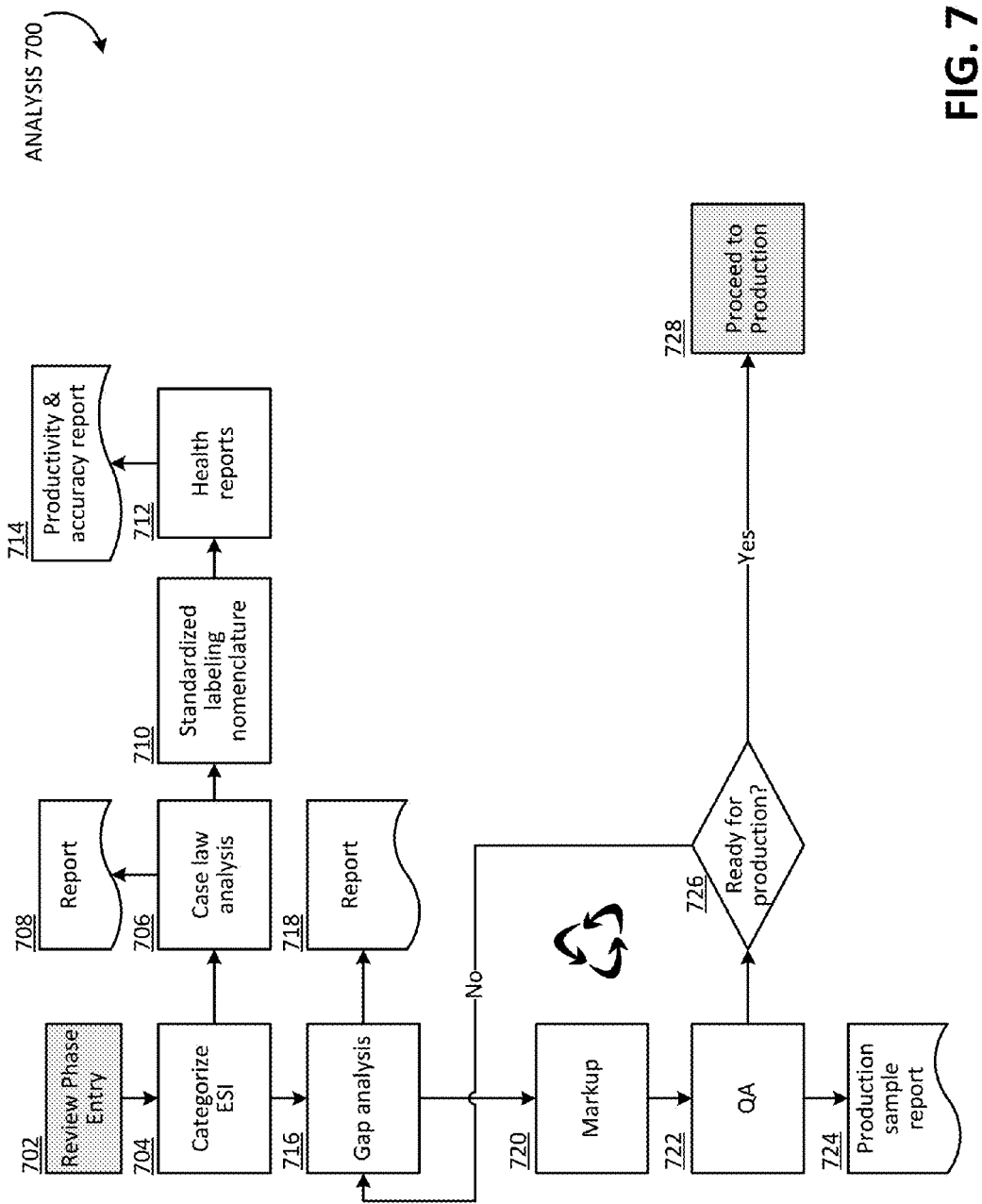
FIG. 7 illustrates a flow chart for the Analysis Phase 135 according to embodiments of the present invention.

FIG. 7 illustrates a flowchart for the Analysis Phase according to embodiments of the present invention. FIG. 7 may disclose OPERATION 135 of FIG. 1 in greater detail. Referring now to FIG. 7, at OPERATION 702 the Analysis Phase is entered from the Review Phase.

At OPERATION 704, ESI may be categorized. According to embodiments, during this operation, determination of matters, such as: is the ESI an image and is it pertinent to a particular work product. As should be appreciated, legal strategy may be utilized to figure out how to categorize ESI.

At OPERATION 706, a case law analysis may be conducted, where decisions from other cases may need to be taken into account. At OPERATION 708, results from the case law analysis may be reported.

At OPERATION 710, a standardized labeling nomenclature may be decided upon. Depending upon what may be desired for the particular discovery matter, a Bates label format may be used to identify records obtained during discovery proceedings. Alternatively, in some cases, file names may be left in their original format.

At OPERATION 712, a health report may be generated. According to embodiments, a health report may reveal such information as productivity and accuracy of a reviewer during the Review Process.

At OPERATION 714, a productivity and accuracy report may be generated.

After ESI is categorized in OPERATION 704, at OPERATION 716, a gap analysis may be conducted. According to embodiments, a gap analysis may reveal such information as: has anything been missed; once data has been categorized, are there some areas in which there is less data than was expected; etc. According to an embodiment, the gap analysis may be an automated process. The results from the gap analysis may be reported at OPERATION 718.

At OPERATION 720, a mark-up process may commence. According to embodiments, during a mark-up process, files may be physically tagged according to what may be privileged, relevant, non-relevant, etc.

At OPERATION 722, a quality assurance service may be performed to ensure the work product (marked-up files) matches requirements set for the particular discovery request.

At OPERATION 724, a sampling of the marked-up data may be reviewed to see if it is ready for production, and a report may be generated.

At DECISION OPERATION 726, a determination is made as to whether or not the marked-up data is ready for production.

If it is determined that the data is not ready for production, the process repeats OPERATIONS 716-726.

Once it is determined that the data is ready for production, at OPERATION 728, the method proceeds to the Production Phase.

Figure 8:
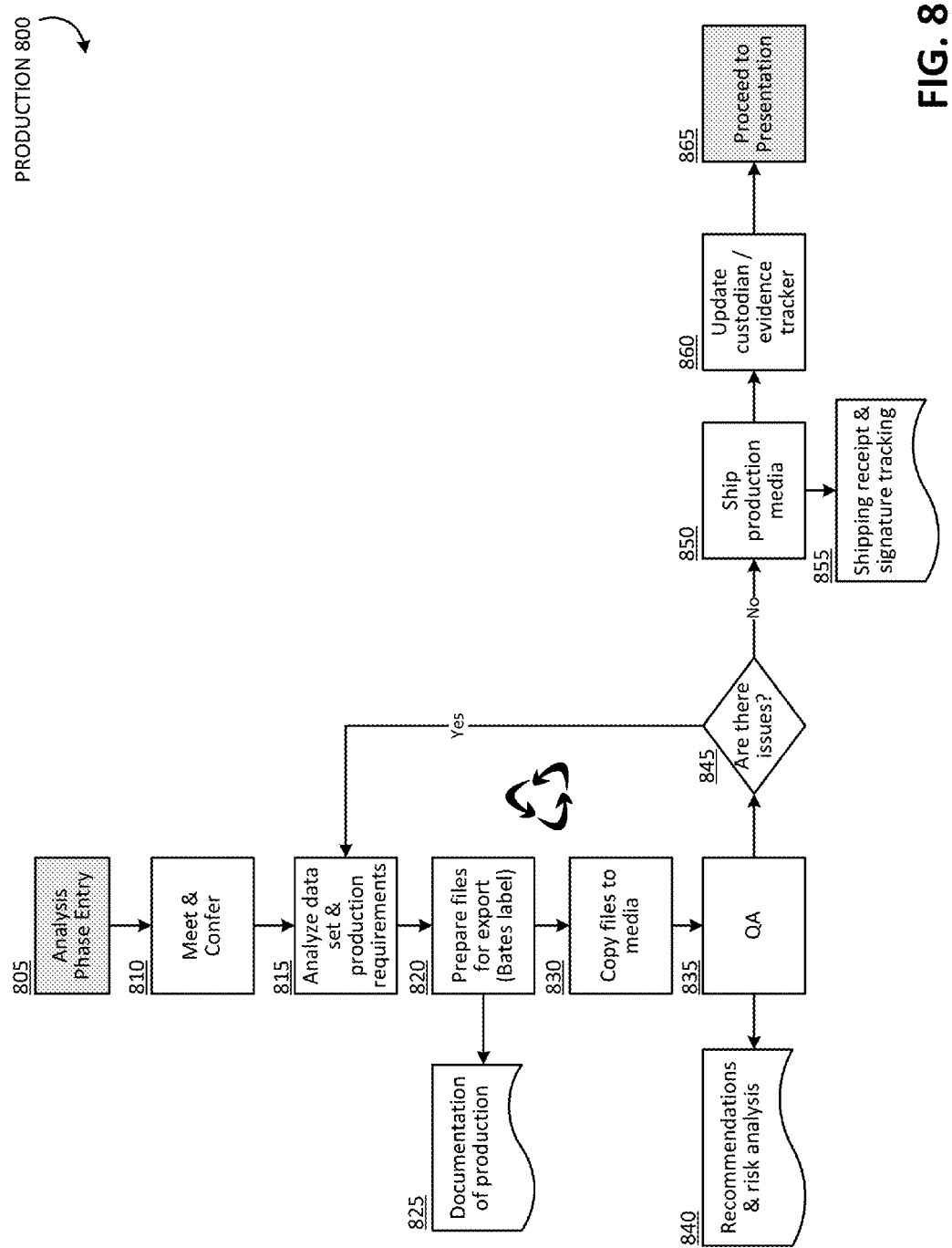
FIG. 8 illustrates a flow chart for the Production Phase 140 according to embodiments of the present invention.

FIG. 8 illustrates a flowchart for the Production Phase according to embodiments of the present invention. FIG. 8 may disclose OPERATION 140 of FIG. 1 in greater detail. Referring now to FIG. 8, at OPERATION 805 the Production Phase is entered from the Analysis Phase.

At OPERATION 810, a meet and confer may occur.

At OPERATION 815, the data set may be analyzed to make sure it meets production requirements.

At OPERATION 820, files may be prepared for export. According to embodiments, this may comprise identifying data with a Bates label or according to requirements agreed up on the 26(f) conference.

At OPERATION 825, documentation of the production process may be recorded.

At OPERATION 830, files may be copied to an applicable media (e.g., CD, DVD, hard drive, etc.) depending upon the amount of data.

At OPERATION 835, a quality assurance service may be performed to ensure the work product (data set) matches requirements set for the particular discovery request.

At OPERATION 840, a risk analysis may be performed, wherein risk elements may be identified. Recommendations may be made according to results of the risk analysis.

At DECISION OPERATION 845 a determination is made as to whether any issues were found in the quality assurance performed at OPERATION 835.

If issues are found, the process may repeat OPERATIONS 815-845 until all issues are resolved.

If it is determined at DECISION OPERATION 845 that there are no issues with the data set, at OPERATION 850 the production media may be shipped to a recipient as determined in the meet and confer in OPERATION 810. For example, the recipient may be opposing counsel or a processor, etc.

At OPERATION 855, a shipping receipt may be obtained and proof of delivery information may be requested through a signature tracking feature.

At OPERATION 860, the custodian/evidence tracker spreadsheet may be updated.

At OPERATION 865, the method proceeds to the Presentation Phase.

Figure 9:
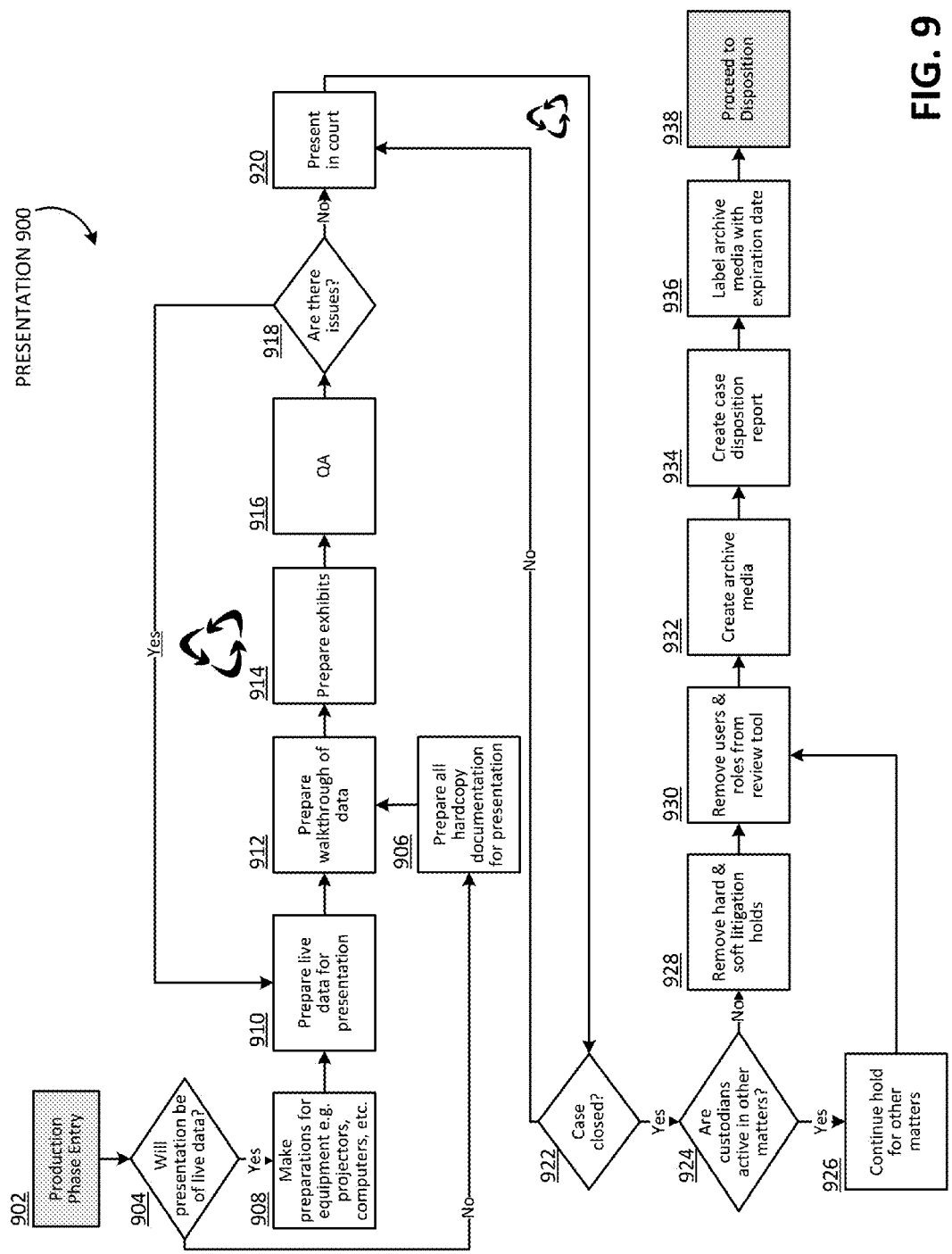
FIG. 9 illustrates a flow chart for the Presentation Phase 145 according to embodiments of the present invention.

FIG. 9 illustrates a flowchart for the Presentation Phase according to embodiments of the present invention. FIG. 9 may disclose OPERATION 145 of FIG. 1 in greater detail. Referring now to FIG. 9, at OPERATION 902 the Presentation Phase is entered from the Production Phase. According to embodiments, the Presentation Phase is when data may be displayed before an audience (e.g., at depositions, hearings, trials, etc.).

At DECISION OPERATION 904, a determination is made as to whether live data may be presented.

If it is determined that live data may be presented, at OPERATION 908, preparations may be made for equipment needed to display live data (e.g., projectors, computers, etc.).

At OPERATION 910, live data may be prepared for presentation. According to embodiments, this operation may comprise making sure that the person presenting the data knows what needs to be done to present it.

If it is determined at DECISION OPERATION 904 that live data may not be presented, hardcopy documents may be prepared for presentation.

After physical data is prepared in OPERATION 906 and live data is prepared in OPERATION 910, at OPERATION 912, a walkthrough of the data may be prepared.

At OPERATION 914, exhibits may be prepared.

At OPERATION 916, a quality assurance service may be performed to ensure there are no issues with the data and exhibits.

At DECISION OPERATION 918, a determination is made as to whether any issues are found.

If it is determined that an issue is found, OPERATIONS 910-918 may be repeated until issues are resolved.

Once no issues are found, at OPERATION 920, data may be presented before an audience (e.g., at depositions, hearings, trials, etc.).

At DECISION OPERATION 922, a determination is made as to whether the case is closed.

If it is determined that the case is not closed, the process may repeat OPERATIONS 920-922 until it is determined that the case is closed.

Once the case is determined closed, at OPERATION 924, a case overlap report may be performed to see if any custodians in this discovery matter may be a custodian in another matter (historically, concurrently, or future-facing).

If it is determined that a custodian is active in another discovery matter, at OPERATION 926, litigation holds may be continued for the other matters.

If it is determined that a custodian is not active in another discovery matter, at OPERATION 928, hard and soft litigation holds may be removed.

At OPERATION 930, users and roles may be removed from the review tool.

At OPERATION 932, an archive media may be created to store data on so that data may be removed from the SAN disc.

At OPERATION 934, a case disposition report may be created. According to embodiments, when a disposition report is created for a case, the case may be marked as closed in the database.

At OPERATION 936, the archive media created in OPERATION 932 may be labeled with an expiration date according to a records retention schedule.

At OPERATION 938, the method proceeds to the Disposition Phase.

Figure 10:
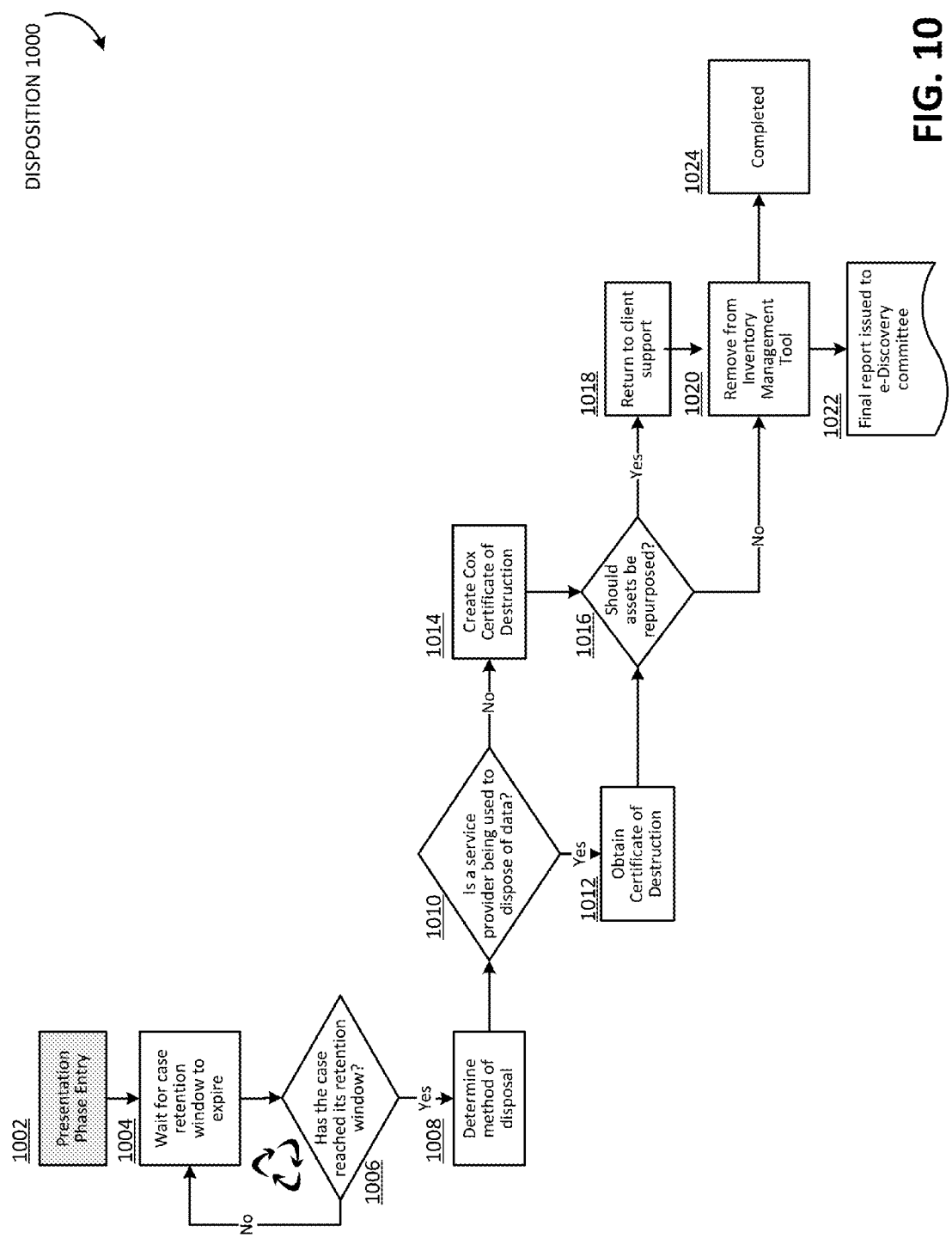
FIG. 10 illustrates a flow chart for the Disposition Phase 150 according to embodiments of the present invention.

FIG. 10 illustrates a flowchart for the Disposition Phase according to embodiments of the present invention. FIG. 10 may disclose OPERATION 150 of FIG. 1 in greater detail. Referring now to FIG. 10, at OPERATION 1002 the Disposition Phase is entered from the Presentation Phase. According to embodiments, media that has been preserved for the particular discovery case may be disposed of in the Disposition Phase.

At OPERATION 1004, an amount of time may pass until the case retention window expires.

At DECISION OPERATION 1006, a determination is made as to whether the case retention window has expired.

If it is determined that the case retention window has not expired, the method may repeat OPERATIONS 1004-1006 until the case retention window has expired.

Once it is determined that the case retention window has expired, at OPERATION 1008, a method of disposing data may be determined.

At DECISION OPERATION 1010, a determination may be made as to who may dispose of data. According to embodiments, a service provider may be used, or disposal of data may be conducted in-house.

If it is determined that a service provider will dispose of the data, at OPERATION 1012, a certificate of destruction may be obtained by the institution from the service provider.

If it is determined that disposal of data will be conducted in-house, at OPERATION 1014, the institution may create a certificate of destruction.

At DECISION OPERATION 1016, a determination is made as to whether an asset should be repurposed. Oftentimes, a retention window lasts an amount of time in which assets may no longer be considered functional or useful (e.g., computer). Other assets, such as a physical printout or external device may be determined as an asset to be repurposed.

If it is determined that an asset can be repurposed, at OPERATION 1018, the asset is returned to client support so that it may be repurposed.

If it is determined that an asset cannot be repurposed in DECISION OPERATION 1016, or after a re-usable asset is returned to client support in OPERATION 1018, at OPERATION 1020, the asset may be removed from the inventory management tool where all facts concerning an asset were tracked for the discovery matter.

At OPERATION 1022, a final report may be issued to the e-discovery committee.

The process ends at OPERATION 1024.

Embodiments of the present invention, for example, are described above with reference to block diagrams and/or operational illustrations of methods, systems, and computer program products according to embodiments of the invention. The functions/acts noted in the operations may occur out of the order as shown in any flowchart. For example, two operations shown in succession may in fact be executed substantially concurrently or the operations may sometimes be executed in the reverse order, depending upon the functionality/acts involved.

While certain embodiments of the invention have been described, other embodiments may exist. Furthermore, although embodiments of the present invention have been described as being associated with data and computer-executable steps or operations stored in memory and other storage mediums, data and computer-executable steps or operations can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. In an automated electronic information management system, a method for preservation and collection of electronically-stored information (ESI) assets, comprising:
   electronically gathering the ESI assets;
   identifying noise files, wherein noise files comprise ESI assets excluded from a discovery matter, wherein the noise files comprise application files;
   identifying duplicate ESI assets, wherein identifying duplicate ESI assets further comprises hashing the duplicate ESI assets identified;
   determining a standardized nomenclature to apply as files names for the ESI assets;
   applying the standardized nomenclature to the files names of the ESI assets;
   extracting metadata for each of the ESI assets;
   indexing the ESI assets;
   performing a keyword search of the ESI assets and metadata to locate ESI assets having one or more keywords;
   preparing a keyword hit report including scope and size of results of the keyword search of the ESI assets;
   determining whether the one or more keywords generated too many non-responsive results;
   in response to the one or more keywords not generating too many non-responsive results, applying a computer-executable formatting to the ESI assets, having the one or more keywords, for review;
   categorizing the ESI assets; and
   conducting a gap analysis, wherein the gap analysis utilizes the categorized ESI assets to identify information relating to missing data and insufficient amounts of data.

2. The method of claim 1, wherein identifying noise files further comprises applying an image hash to the ESI assets identified as noise files, and in response to identifying the noise files, removing the identified noise files from the gathering of ESI assets.

3. The method of claim 1, further in response to the one or more keywords not generating too many non-responsive results, updating a statement of work (SOW) with the one or more keywords.

4. The method of claim 1, further comprising reviewing the stored ESI assets based on the extracted and indexed metadata for any of the ESI assets containing privileged data.

5. The method of claim 4, further comprising electronically marking the any of the ESI assets containing privileged data as containing privileged data.

6. The method of claim 3, further comprising determining that the review will be completed internally.

7. The method of claim 6, in response to determining that the review will be completed internally, preparing a load file wherein preparing comprises production of standard output files for use with standard review tools.

8. The method of claim 7, further comprising uploading the load file in to a review platform application.

9. The method of claim 1, further comprising:
   marking the categorized ESI assets, wherein marking the categorized ESI assets comprises tagging the categorized ESI assets with at least one of the following: privileged, non-privileged, relevant, and non-relevant.

10. The method of claim 1, wherein the standardized nomenclature is a Bates label format.

11. A Non-Transitory computer-readable medium having stored thereon computer executable instructions which when executed by a computer perform a method for automated electronic information management, comprising:
   electronically gathering the ESI assets;
   identifying noise files, wherein noise files comprise ESI assets excluded from a discovery matter, wherein the noise files comprise application files;
   identifying duplicate ESI assets, wherein identifying duplicate ESI assets further comprises hashing the duplicate ESI assets identified;
   determining a standardized nomenclature to apply as files names for the ESI assets;
   applying the standardized nomenclature to the files names of the ESI assets;
   extracting metadata for each of the ESI assets;
   indexing the ESI assets;
   performing a keyword search of the ESI assets and metadata to locate ESI assets having one or more keywords;
   preparing a keyword hit report including scope and size of results of the keyword search of the ESI assets;
   determining whether the one or more keywords generated too many non-responsive results;
   in response to the one or more keywords not generating too many non-responsive results, applying a computer-executable formatting to the ESI assets, having the one or more keywords, for review;
   categorizing the ESI assets; and
   conducting a gap analysis, wherein the gap analysis utilizes the categorized ESI assets to identify information relating to missing data and insufficient amounts of data.

12. The computer-readable storage medium of claim 11, wherein identifying noise files further comprises applying an image hash to the ESI assets identified as noise files.

13. The computer-readable storage medium of claim 12, in response to identifying the noise files, removing the identified noise files from the gathering of ESI assets.

14. The computer-readable storage medium of claim 11, further in response to the one or more keywords not generating too many non-responsive results, updating a statement of work (SOW) with the one or more keywords.

15. The computer-readable storage medium of claim 11, further comprising reviewing the stored ESI assets based on the extracted and indexed metadata for any of the ESI assets containing privileged data.

16. The computer-readable storage medium of claim 15, further comprising determining whether the review electronically marking the any of the ESI assets containing privileged data as containing privileged data.

17. The computer-readable storage medium of claim 14, further comprising determining that the review will be completed internally.

18. The computer-readable storage medium method of claim 17, in response to determining that the review will be completed internally, preparing a load file wherein preparing comprises production of standard output files for use with standard review tools.

19. The computer-readable storage medium of claim 18, further comprising uploading the load file in to a review platform application.

20. An automated electronic information management system comprising:
a processor;
a memory; and
a software module operative:
to electronically gather the ESI assets;
to identify noise files, wherein noise files comprise ESI assets excluded from a discovery matter, wherein the noise files comprise application files;
to apply an image hash to the ESI assets to remove noise files;
to identify duplicate ESI assets;
to apply a hash to the duplicate ESI assets;
to determine a standardized nomenclature to apply as files names for the ESI assets;
to apply the standardized nomenclature to the files names of the ESI assets;
to extract metadata for each of the ESI assets;
to index the ESI assets;
to perform a keyword search of the ESI assets and metadata to locate ESI assets having one or more keywords;
to prepare a keyword hit report including scope and size of results of the keyword search of the ESI assets;
to determine whether the one or more keywords generated too many non-responsive results;
in response to the one or more keywords not generating too many non-responsive results, to apply a computer-executable formatting to the ESI assets, to have the one or more keywords, for review;
to categorize the ESI assets; and
to conduct a gap analysis, wherein the gap analysis utilizes the categorized ESI assets to identify information relating to missing data and insufficient amounts of data.

* * * * *